(12) United States Patent
Wang et al.

(10) Patent No.: US 7,925,602 B2
(45) Date of Patent: Apr. 12, 2011

(54) MAXIMUM ENTROPY MODEL CLASSFIER THAT USES GAUSSIAN MEAN VALUES

(75) Inventors: Ye-Yi Wang, Redmond, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 11/952,130

(22) Filed: Dec. 7, 2007

(65) Prior Publication Data

US 2009/0150308 A1  Jun. 11, 2009

(51) Int. Cl.
*G06E 1/00* (2006.01)
(52) U.S. Cl. .................................................... 706/20
(58) Field of Classification Search ............ 706/20, 706/12; 704/200, 205, 219–222, 231, 251
See application file for complete search history.

(56) References Cited

U.S. PATENT DOCUMENTS

| | | | |
|---|---|---|---|
| 5,640,487 A | 6/1997 | Lau et al. | |
| 6,415,248 B1 | 7/2002 | Bangalore et al. | |
| 7,107,207 B2 | 9/2006 | Goodman | |
| 7,107,266 B1 | 9/2006 | Breyman et al. | |
| 7,769,759 B1 * | 8/2010 | Gartung et al. | 707/737 |
| 2001/0003174 A1 | 6/2001 | Peters | |
| 2003/0125942 A1 | 7/2003 | Peters | |
| 2005/0149462 A1 * | 7/2005 | Lee et al. | 706/20 |
| 2005/0228778 A1 | 10/2005 | Perrone | |
| 2006/0020448 A1 * | 1/2006 | Chelba et al. | 704/10 |
| 2006/0136589 A1 | 6/2006 | Konig et al. | |
| 2006/0212288 A1 | 9/2006 | Sethy et al. | |
| 2006/0277173 A1 * | 12/2006 | Li et al. | 707/5 |
| 2007/0022069 A1 * | 1/2007 | Goodman | 706/25 |
| 2007/0100624 A1 * | 5/2007 | Weng et al. | 704/257 |
| 2008/0097936 A1 * | 4/2008 | Schmidtler et al. | 706/12 |
| 2008/0183649 A1 * | 7/2008 | Farahani et al. | 706/14 |

OTHER PUBLICATIONS

Khudanpur et al., A Maximum Entropy Language Model Integrating N-Grams and Topic Dependencies for Conversational SPeech Recognition, 1999, IEEE, pp. 553-556.*
Ye-Ye Wang et al., "Maximum Entropy Model Parameterization With TF*IDF Weighted Vector Space Model", In Proceedings of the IEEE Workshop on Automatic Speech Recognition & Understanding, Kyoto, Japan, Dec. 9-13, 2007, pp. 213-218.
Dawn J. Lawrie, "Language Models for Hierarchical Summarization", Date: Sep. 2003.
Kruengkrai, et al., "Document Clustering using Linear Partitioning Hyperplanes and Reallocation", National Institute of Information and Communications Technology, Thailand, Date: 2004.
Roark, et al., "Discriminative n-gram Language Modeling", Oregon Health & Science University, Beaverton, USA.
Xu, et al., "Training Connectionist Models for the Structured Language Model", Johns Hopkins University, Baltimore, MD.

* cited by examiner

*Primary Examiner* — David R Vincent

(57) ABSTRACT

Described is a technology by which a maximum entropy model used for classification is trained with a significantly lesser amount of training data than is normally used in training other maximum entropy models, yet provides similar accuracy to the others. The maximum entropy model is initially parameterized with parameter values determined from weights obtained by training a vector space model or an n-gram model. The weights may be scaled into the initial parameter values by determining a scaling factor. Gaussian mean values may also be determined, and used for regularization in training the maximum entropy model. Scaling may also be applied to the Gaussian mean values. After initial parameterization, training comprises using training data to iteratively adjust the initial parameters into adjusted parameters until convergence is determined.

6 Claims, 3 Drawing Sheets

MAXIMUM ENTROPY MODEL CLASSFIER THAT USES GAUSSIAN MEAN VALUES

BACKGROUND

Various mechanisms are used to classify data, including linear classifiers, an n-gram classifier and a maximum entropy (MaxEnt) model. In general, a linear classifier models input data as a vector of features, and computes its dot products with the vectors of feature weights with respect to the classification classes. The class whose weight vector results in the highest dot product is picked up as the target class. A vector space model is a similarity measure used to perform comparison between two vectors; often one represents a query and the other represents a document. The similarity measure is computed via angular relationships (the normalized dot product, or cosine value) between two vectors. The document vector having the smallest difference with respect to the query vector is considered the best match. If each document is viewed as a class, then the vector space model can be viewed as a linear classification model.

An n-gram (e.g., bigram, trigram and so forth) classifier is another type of linear classifier. Given a query, an n-gram model for each classification class uses probability computations to determine the probability of the query under that class, and the n-gram classifier selects a classification class that has the n-gram language model that gives rise to the highest probability of the query.

Maximum entropy models are generally more accurate than vector space or n-gram models with respect to classification. Maximum entropy models have been used in many spoken language tasks, and also may be used for other tasks such as query classification. The training of a maximum entropy model typically involves an iterative procedure that starts with a flat (all parameters are set to zero) or a random initialization of the model parameters, and uses training data to gradually update the parameters to optimize an objective function. Because the objective function for the maximum entropy models is a convex function, the training procedure converges to a global optimum, in theory.

In practice, the convergence is defined empirically, for example, when the difference between the values of the objective function in two training iterations is smaller than a threshold. Therefore, it is not guaranteed that the model converges at the actual global optimum. Furthermore, the model's training often needs to end early, before convergence, to avoid over-training/over-fitting (e.g., giving too much weight to a mostly irrelevant term). Therefore different model parameter initializations will result in different model parameterization at the end of the training procedure and hence different classification accuracies. It is also a common practice that prior distributions with hyper-parameters are added to the objective function to prevent over-fitting.

When sufficient training data are available, the maximum entropy models are more accurate. Training a maximum entropy model thus requires a considerable amount of labeled training data. When training data are sparse, however, the vector space models are more robust.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a first linear classification model (e.g., a vector space model or an n-gram classifier) is trained to determine a set of initial values that are used to parameterize a second linear classification model (e.g., a maximum entropy model) for its training. For example, the set of initial values may include feature weights that may be applied (including possibly scaling by a scaling factor) into a set of initial parameters for training the maximum entropy model. A Gaussian mean value may also be determined, and used in the regularization distribution for the parameter of a feature in training the maximum entropy model. Training comprises using training data to iteratively adjust the initial parameters into adjusted parameters until convergence is determined or an early stopping criterion is satisfied.

In one aspect, an initialization mechanism determines a set of values, including by training a classification model (a vector space model and/or n-gram classifier). A maximum entropy model training mechanism parameterizes the maximum entropy model with initial parameters prior to using training data to adjust the initial parameters into adjusted parameters. In one example, the set of values comprise a set of weights determined from a mathematical combination of a term frequency (TF) and an inverted document frequency (IDF) for terms used in training a TF*IDF vector space model; terms may comprise text arranged into a document.

The initialization mechanism may include means for scaling the set of values into the initial parameters. The initial parameterization values may further include Gaussian mean values for regularization. Once trained, the maximum entropy model may be used to classify input data.

In one aspect, a set of weights are obtained from a vector space model and/or an n-gram classification model. A maximum entropy model is initialized with initial parameter values corresponding to the set of weights, and then trained using training data to adjust the parameter values from their initial parameter values into adjusted parameter values. The set of weights may be scaled into the initial parameter values, e.g., by determining and applying a scaling factor. The maximum entropy model may also be hyper-parameterized with the regularization Gaussian mean value for each parameter being set to the initial value of the parameter, which also may be scaled.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards training a maximum entropy model in a manner that uses less training data, yet generally achieves the accuracy of maximum entropy models that are trained with significantly more training data. To this end, initialization of the objective function's parameters prior to iterative processing results in significantly improved accuracy, especially when the amount of training data are sparse. In one aspect, instead of initializing by setting a function's parameters to zero or using random initialization as is known, different initialization and hyper-parameter (for regularization) settings based on a vector space model and/or an n-gram classification model, significantly affect classification accuracy.

In one example, maximum entropy model training includes initialization/regularization of its parameters based on an n-gram classifier and/or a term frequency/inverted document frequency-based (TF*IDF) weighted vector space model. Such TF*IDF weighted vector space model initialization/regularization has achieved significant improvements over baseline flat initialization/regularization, especially when the amount of training data are sparse.

As will be understood, various examples set forth herein are primarily described with respect to training a maximum entropy model for text-based query classification. As can be readily appreciated, the technology makes maximum entropy models applicable to many more types of applications/services, including spoken language understanding, SPAM filtering, providing instant answers for web queries, and so forth.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in data classification in general.

Figure 1:
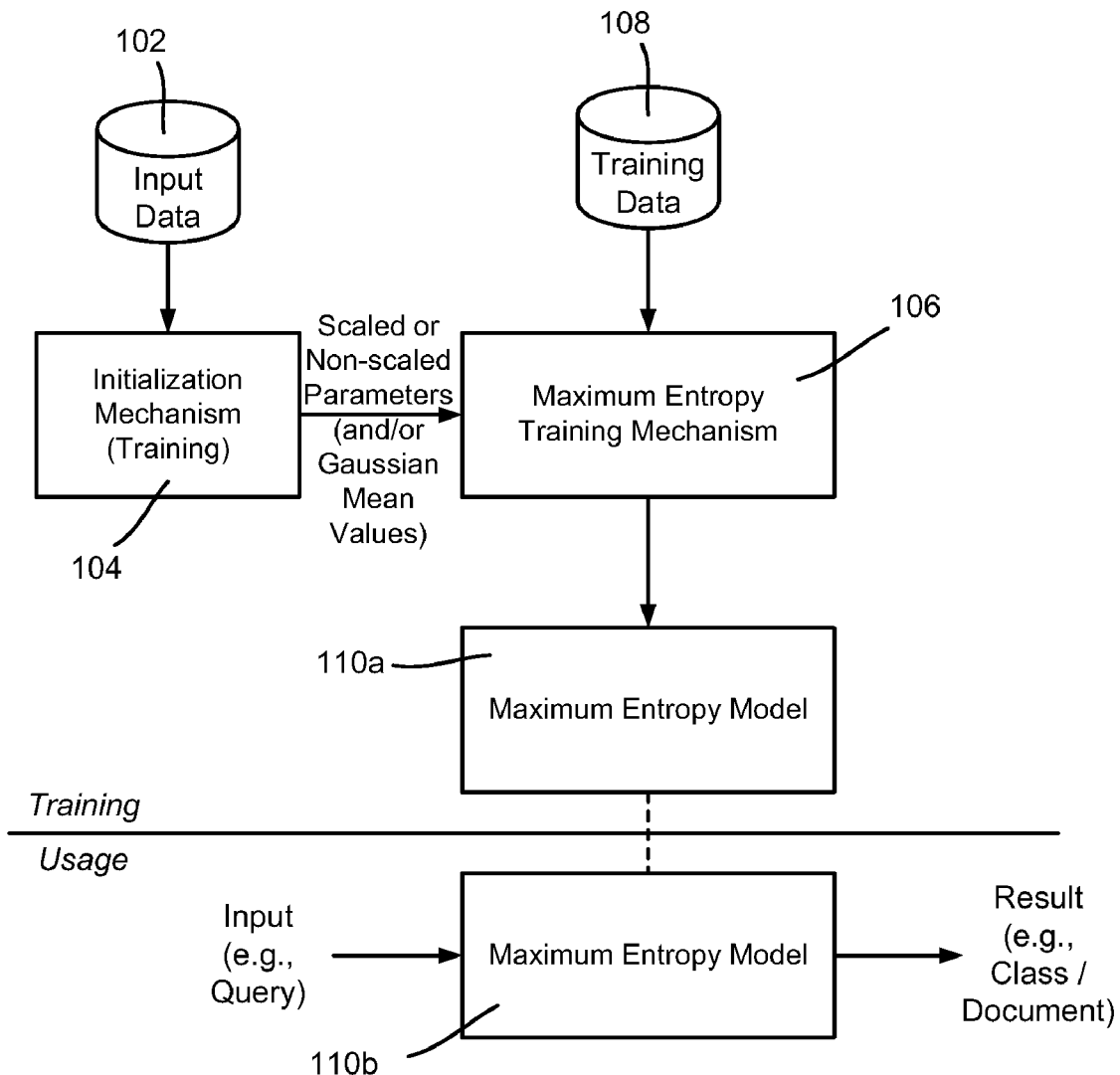
FIG. 1 is a block diagram representing example components of for training a maximum entropy model using initialization parameters determined from a vector space model or n-gram classification model.

Turning to FIG. 1, there is shown general conceptual diagram including components that train a maximum entropy model for use in subsequent classification tasks. In FIG. 1, input data 102 is used to train an initialization mechanism 104, which is exemplified as a TF*IDF weighted vector space model (where TF stands for term frequency and IDF stands for inverted document frequency; the TF*IDF weighted vector space model is hereinafter generally abbreviated as the TF*IDF model) or an n-gram classifier as described below.

In general, a TF*IDF model is a matrix that measures the similarity between two entities (e.g., between a query and a document). For example, the TF*IDF model is widely used in information retrieval (IR). As is known, the TF*IDF weighted vector space model is very robust in comparing the similarity of a query and a document. A TF*IDF model can be formalized as a classification model, where each document forms a class and the model assigns a class to a query according to their similarity.

To train a TF*IDF model, input data 102 in the form of one or more examples with the same destination class are concatenated to form a document, and a TF*IDF weighted vector is constructed to represent the class; (in one implementation, only one example may be needed for each class). Following training, a set of feature weights is known.

More particularly, the TF*IDF represents a query (document) with a vector q(d). The relevance (or similarity) of a document to the query is measured as the cosine between the two vectors:

$$\cos(q, d) = \frac{q \cdot d}{\|q\| \|d\|} \quad (1)$$

For a document d, each element of its vector is a weight that represents the importance of a term (e.g., a word or a bigram) in the document. Intuitively, the importance increases proportionally to the number of times a term appears in d and decreases when the term appears in many different documents. The term frequency $tf_i(d)$ or TF is the relative frequency of term i in d; the inverted document frequency (IDF) is the logarithm of the total number of documents divided by the number of documents containing i:

$$tf_i(d) = \frac{n_i(d)}{\sum_k n_k(d)}, \quad idf_i = \log \frac{|D|}{|\{d : i \in d\}|}$$

where $n_i(d)$ the number of occurrences of term i in d, and D is the entire document collection. The weight for term i in the vector is based upon its TF and IDF scores. The vector for a query can be defined similarly.

For an n-gram classifier, input data 102 in the form of examples that are labeled with the same destination class are pooled together to train the class specific n-gram model. More particularly, an n-gram classifier models the conditional distribution according to a channel model:

$$P(C \mid Q) \propto P(C)P(Q \mid C) = P(C) \prod_i P(Q_i \mid Q_{i-n+1}, \ldots, Q_{i-1}; C) \quad (2)$$

A class-specific n-gram model is used to model P(Q|C). The n-gram model parameters may be estimated with Maximum Likelihood training on a labeled training set. An n-gram model is often smoothed by interpolating with a lower order model, e.g., (the interpolation of unigram and bigram) models:

$$P(Q \mid C) = \prod_i [(\delta P(Q_i \mid C) + (1 - \delta) P(Q_i \mid Q_{i-1}, C)] \quad (3)$$

The n-gram classification model is also used for information retrieval when each document in a document collection is treated as a class c.

As represented in FIG. 1, following training the initialization mechanism 104 provides a set of weights as initialization parameters to a maximum entropy training mechanism 106. As described below, the weights correspond to the feature weights determined during vector space model training or n-gram training, scaled by a constant. As also described below, the means of the Gaussian distributions may be optionally determined as part of initialization training, and used in regularization of the maximum entropy model.

In general and as represented in FIG. 1, the maximum entropy training mechanism uses the weights from the initialization mechanism 104 (and optionally sets the Gaussian mean values to the weights from the initialization mechanism 104) along with training data 108 to train a maximum entropy model 110a. Note that the amount of training data 108 can be significantly less than is ordinarily used to train other maximum entropy models. Also shown in FIG. 1 for completeness is a copy 10b or the like of the maximum entropy model 110a used in actual usage at some later time as a classifier, e.g., to locate a class or document given an input query.

A maximum entropy classifier models the conditional probability distribution P(C|Q) from a set of features F, where C is a random variable representing the classification destinations, and Q is a random variable representing input queries. A feature in F is a function of C and Q. The classifier picks a distribution P(C|Q) to maximize the conditional entropy H(C|Q) from a family of distributions, with the constraint that the expected count of a feature predicted by the conditional distribution equals the empirical count of the feature observed in the training data:

$$\sum_{C,Q} \hat{P}(Q) \cdot P(C \mid Q) \cdot f_i(C, Q) = \sum_{C,Q} \hat{P}(C, Q) \cdot f_i(C, Q), \forall f_i \in \mathcal{F}. \quad (4)$$

where $\hat{P}$ stands for empirical distributions in a training set. The maximum entropy distribution that satisfies Equation (4) has the following exponential (log-linear) form and the parameterization that maximizes the entropy maximizes the conditional probability of a training set of C and Q pairs:

$$P(C \mid Q) = \frac{1}{Z_\lambda(Q)} \exp\left(\sum_{f_i \in \mathcal{F}} \lambda_i f_i(C, Q)\right) \quad (5)$$

$$Z_\lambda(Q) = \sum_C \exp\left(\sum_{f_i \in \mathcal{F}} \lambda_i f_i(C, Q)\right)$$

is a normalization constant, and $\lambda_i$'s are the parameters of the model, also known as the weights of the features. They can be estimated with an iterative procedure that starts from an initial parameterization and gradually updates it towards the optimum. Examples of such training algorithms include Generalized Iterative Scaling and Stochastic Gradient Ascend algorithms.

The objective function in (5) is often added with the regularization terms to avoid model over-fitting:

$$L(\lambda) = \frac{1}{Z_\lambda(Q)} \exp\left(\sum_{f_i \in \mathcal{F}} \lambda_i f_i(C, Q)\right) - \sum_i \frac{(\lambda_i - m_i)^2}{2\sigma^2} \quad (6)$$

The regularization terms penalize a parameter $\lambda_i$ that is too far away from the expected mean value $m_i$. For example, a mostly irrelevant query term such as "the" is thus not given too much weight. Note that $m_i$ is often set to zero. When applying the Stochastic Gradient Ascend algorithm for model optimization the gradient of the objective function is derived as:

$$\frac{\partial \log P(C \mid Q)}{\partial \lambda_i} = E_{\hat{P}(Q,C)} f_i(C, Q) - E_{\hat{P}(Q) P(C \mid Q)} f_i(C, Q) - \frac{\lambda_i - m_i}{\sigma^2} \quad (7)$$

More particularly, while a maximum entropy model has a convex objective function and thus a global optimum, regardless of the initial parameter settings, model initialization factors into the early stopping of training and the different settings of hyper-parameters for model regularization. Described herein is how the parameters from an n-gram classification model or a TF*IDF model may be used in training a maximum entropy model for model initialization and hyper-parameter setting.

The N-gram classifiers, TF*IDF and maximum entropy models have classification boundaries linear to the feature functions. The decision functions of the n-gram classification and the TF*IDF model may be explicitly expressed as the linear combination of the classification features, generally focusing on class prior, unigram and bigram features that are commonly used in text classification. The coefficients of these features are imported by the maximum entropy model as initial weights for initialization or hyper-parameter setting.

Equation (2) above can be written with respect to each term t and term bigram ht in the query:

$$\log P(c \mid q) = \log P(c) + \sum_{ht} N(ht; q) \log(\delta P(t \mid c) + \quad (8)$$
$$(1 - \delta) P(t \mid h, c))$$
$$= \log P(c) + \sum_t N(t; q) \log(\delta P(t \mid c)) +$$
$$\sum_{ht} N(ht; q) \log\left(1 + \frac{(1 - \delta) P(t \mid h; c)}{\delta P(t \mid c)}\right)$$
$$= f_c(c, q) \log P(c) + \sum_t f_{c,t}(c, q) \log(\delta P(t \mid c)) +$$
$$\sum_{ht} f_{c,ht}(c, q) \log\left(1 + \frac{(1 - \delta) P(t \mid h; c)}{\delta P(t \mid c)}\right)$$

In the last step of Equation (8), N(t;q) and N(ht;q), i.e., the unigram and bigram counts in q, are written as the value of integer unigram and bigram feature functions $f_{c,t}$ and $f_{c,ht}$. The term $f_c$ is the class prior feature:

$$f_c(C, Q) = \begin{cases} 1 & \text{if } C = c \\ 0 & \text{otherwise} \end{cases} \quad (9)$$

According to Equation (8), log P(c) is the weight for the class prior feature $f_c$; log($\delta P(t|c)$) is the weight for the unigram feature $f_{c,t}$; and $$\log\left(1 + \frac{(1 - \delta) P(t \mid h; c)}{\delta P(t \mid c)}\right)$$

is the weight for the bigram feature $f_{c,ht}$.

In a TF*IDF model, the cosine score between a class c and a query q in Equation (1) may be written with respect to each term t (note that unlike above, here t represents both unigrams and bigrams in the query):

$$\cos(q, c) = \frac{q \cdot c}{\|q\|\|c\|} \quad (10)$$

$$= \sum_{t \in q} \frac{tf_t(q) \times idf_t \times tf_t(c) \times idf_t}{\|q\|\|c\|}$$

$$= K \sum_{t \in q} \frac{f_{c,t}(c, q) \times tf_t(c) \times idf_t^2}{\|c\|}$$

Because the norm of the query does not affect the classification boundary, it gets absorbed by the constant factor K. The relative term frequency $tf_t(q)$ is replaced by the integer feature value (the number of occurrences of a term) $f_{c,t}(c,q)$ because they differ by a constant factor, namely the number of occurrences of the different terms. Because K does not change the decision boundary, the weight in this linear classification model for the feature $f_{c,t}(c,q)$ may be set forth as:

$$\lambda_{c,t} = tf_t(c) idf_t^2 / \|c\| \quad (11)$$

Equation (11) may be viewed as a parameter sharing mechanism. While there are $|C| \times |T|$ parameters in a linear classification model, they depend on $tf_t(c)$, $idf_t$, and $\|c\|$. There are only $|T|$ and $|C|$ parameters for the IDFs and the class norms, and the term frequency parameters depend only on the rank of a term in a class instead of its identity. Therefore, the terms having the same rank in a class (document) have their parameters tied.

Turning to an aspect referred to as scaling, for a linear classification model, scaling of its parameters by a constant factor does not change the decision boundary. However, the scaling of model parameters does change the value of the maximum entropy objective function.

More particularly, because the initial parameterization is (most likely) not in the optimal scale for the maximum entropy objective function, the initialization is first scaled by a constant, or scaling factor k to optimize the maximum entropy objective function after it has been imported from another linear classifier. There is thus a need to find the scaling factor k that maximize:

$$P(C \mid Q) = \frac{1}{Z_\lambda(Q)} \exp\left(\sum_{f_i \in \mathcal{F}} k\lambda_i f_i(C, Q)\right) \quad (12)$$

with the $\lambda$ parameters fixed at their imported values. This can be done with a gradient based optimization, where $$\frac{\partial \log P(C \mid Q)}{\partial k} = E_{\tilde{P}(Q,C)} \sum_{f_i} \lambda_i f_i(C, Q) - E_{\tilde{P}(Q) P(C \mid Q)} \sum_{f_i} \lambda_i f_i(C, Q) \quad (13)$$

Note that instead of using zero means for the Gaussian priors in the objective function of Equation (7), $m_i$ can be initialized with another linear classifier's parameterization. In doing so, such regularization takes into account the importance of features determined by a simpler (with fewer free parameters) model instead of treating them equally.

Thus, considering TF*IDF initialization, there are various ways to parameterize the maximum entropy training mechanism. For example, the initial model parameters may be set according to Equation (11), with the Gaussian means set to zero. Alternatively, a scaled TF*IDF initialization (with the Gaussian means value set to zero) sets the maximum entropy parameters according to Equation (11) and then scales the parameters by a factor of k, found by optimizing the objective function in Equation (12). As another alternative, a TF*IDF initialization may use the TF*IDF mean option to set not only the initial parameters, but also set the Gaussian means for regularization according to Equation (11). In yet another alternative, TF*IDF initialization may both perform scaling and provide the Gaussian mean regularization option, whereby the maximum entropy training mechanism is initialized with scaled values for the parameters and the Gaussian means regularization.

Similarly, a maximum entropy parameterization with an n-gram classifier may operate in the same various ways. In other words, the parameterization may be scaled or non-scaled, and/or have a zero regularization mean setting or a non-scaled and scaled initialization/regularization mean setting according to Equation (8).

Figure 2:
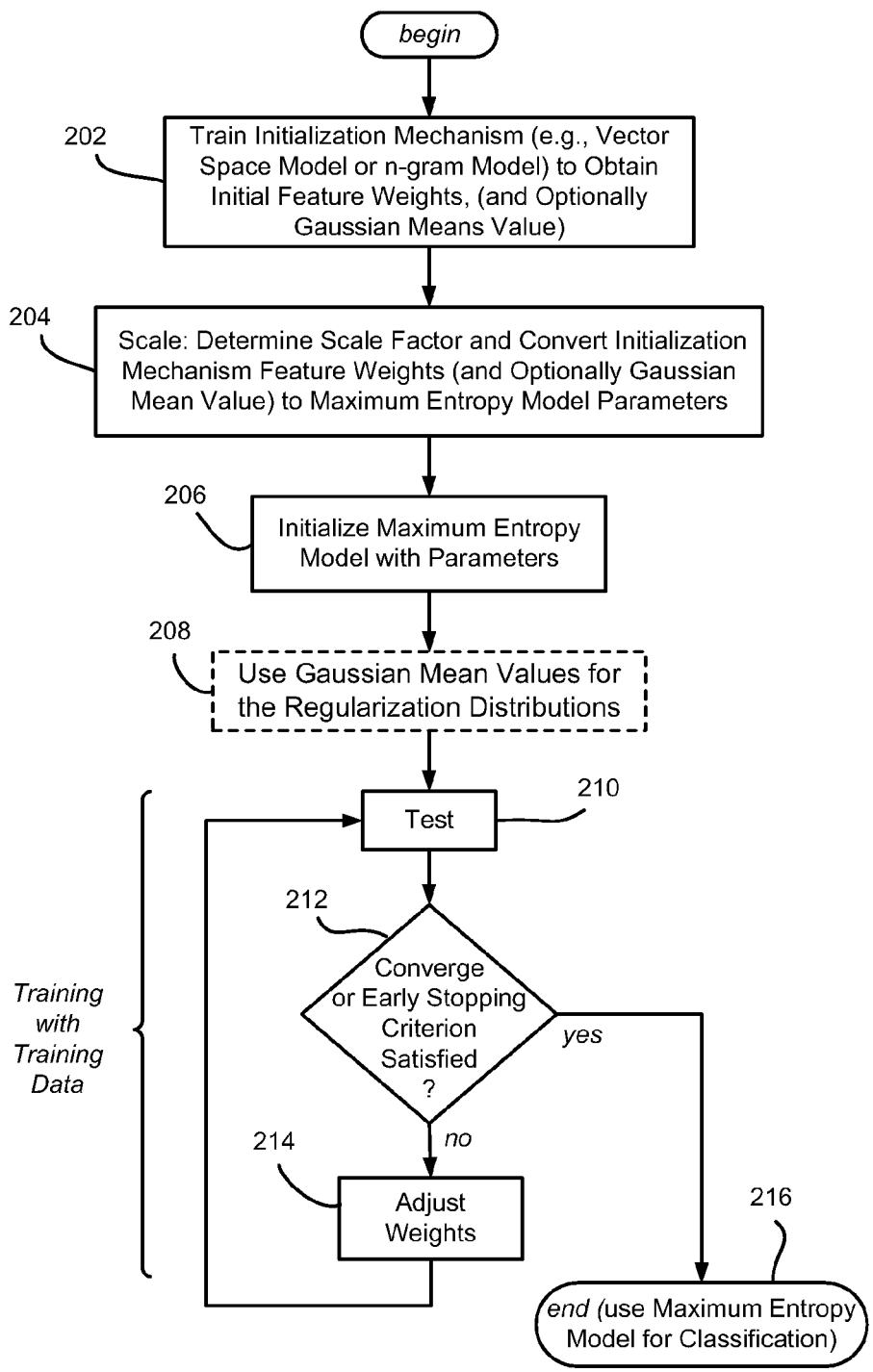
FIG. 2 is a flow diagram representing example steps that may be taken to train a maximum entropy model.

Turning to FIG. 2, FIG. 2 is a flow diagram that summarizes various example steps that may be taken in an example maximum entropy model training process. Step 202 represents the initial training mechanism operation, using a vector space model or n-gram model to obtain the initial feature weights, (and optionally the Gaussian means value) for parameterization of the objective function. Note that the scaling function K is likewise determined at this time.

Step 204 represents using the scaling option to convert the weights (and optionally the Gaussian means value) to parameterization values better suited to the objection function. Note that scaling and thus step 204 is optional, but has been found to provide better results when scaling is used, and is thus shown as being performed in this example process. Further, note that to avoid confusion, the term "weights" refer to the pre-scaled values, while the term "parameters" refer to the post-scaled values, even though both are interchangeably used in linear classification models in general.

Step 206 initializes the maximum entropy model with the (scaled) parameters provided by step 204. If the Gaussian means option is selected, step 208 puts in the scaled value for regularization. Note that step 208 is shown by a dashed block to emphasize that it is optional.

Steps 210, 212 and 214 are then performed to train the now-parameterized model using the training data 108 (FIG. 1). In general, training is iterative, as the parameter values are adjusted via step 214 (by varying i in equation (6)) until convergence is determined or an early stopping criterion has been satisfied at step 212. Once fully trained with adjusted parameters, the maximum entropy model may be used for classification (step 216).

Exemplary Operating Environment

Figure 3:
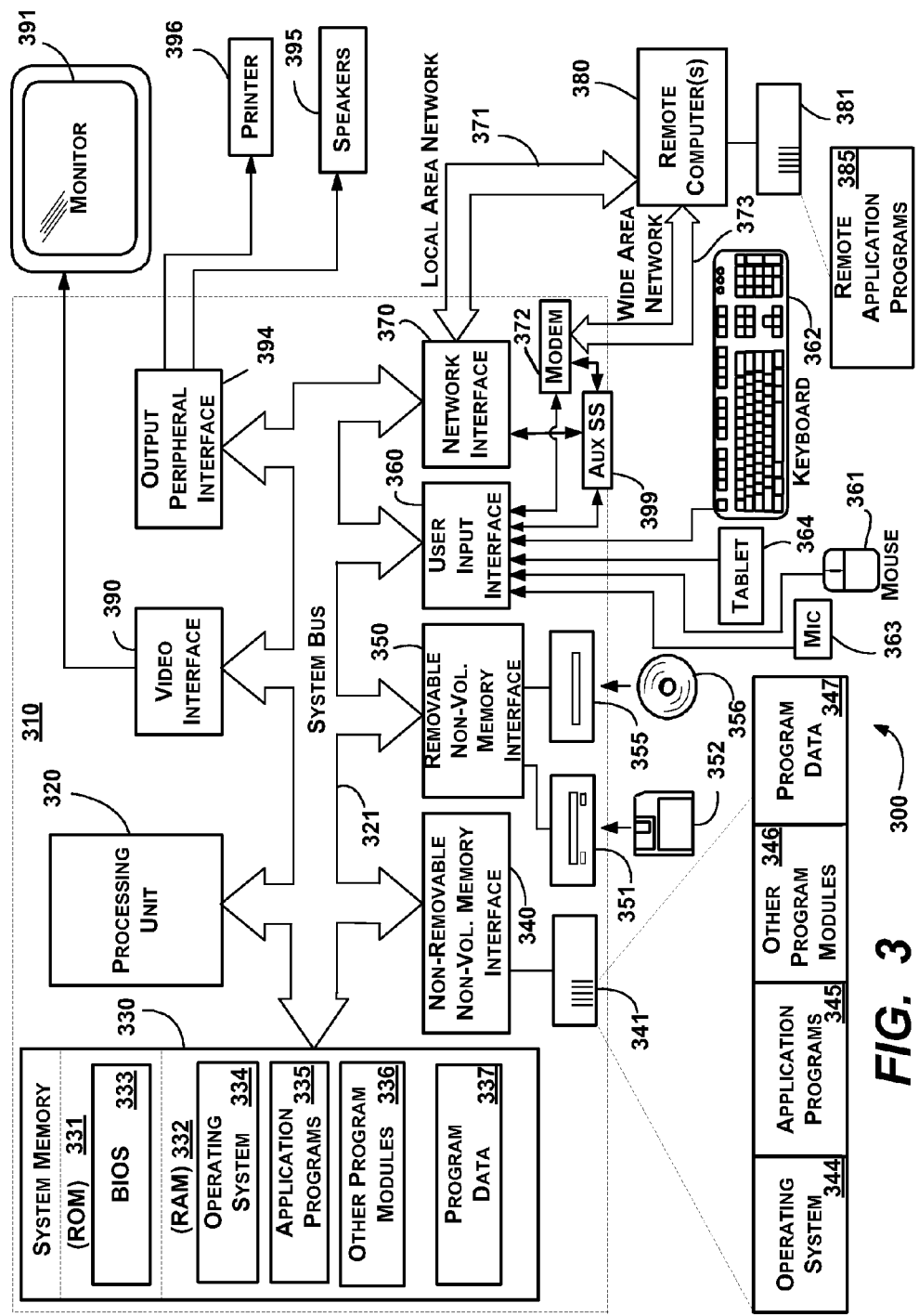
FIG. 3 shows an illustrative example of a computing environment into which various aspects of the present invention may be incorporated.

FIG. 3 illustrates an example of a suitable computing system environment 300 on which the on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component 374 such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
   a computer comprising a processing unit coupled to a memory, the computer further comprising:
   an initialization mechanism that determines a set of values by training a classification model, wherein the set of values includes Gaussian mean values;
   a maximum entropy model training mechanism that trains a maximum entropy model, the training mechanism configured to parameterize the maximum entropy model with initial parameters corresponding to the set of values determined by the initialization mechanism, and to train the maximum entropy model using training data to adjust the initial parameters into adjusted parameters, wherein the training mechanism parameterizes the maximum entropy model with values corresponding to the Gaussian mean values; and
   means for using the maximum entropy model as a classifier of input data.

2. The system of claim 1 wherein the set of values comprise a set of weights determined from a term frequency (TF) and an inverted document frequency (IDF) for terms used in training a TF*IDF vector space model.

3. The system of claim 2 wherein the terms comprise text arranged into a document.

4. The system of claim 1 wherein the initialization mechanism comprises an n-gram classifier, and wherein the set of values comprise a set of weights determined by training the n-gram classifier.

5. The system of claim 1 wherein the initialization mechanism includes means for scaling the set of values into the initial parameters.

6. The system of claim 1 wherein the initialization mechanism includes means for scaling the Gaussian mean values for regularization.

* * * * *